United States Patent [19]

Chin et al.

[11] 4,349,796
[45] Sep. 14, 1982

[54] DEVICES INCORPORATING PHONON FILTERS

[75] Inventors: Maurice A. Chin, South Plainfield; Venkatesh Narayanamurti; Horst L. Störmer, both of Summit, all of N.J.

[73] Assignee: Bell Telephone Laboratories, Incorporated, Murray Hill, N.J.

[21] Appl. No.: 216,172

[22] Filed: Dec. 15, 1980

[51] Int. Cl.$^3$ .................. H03H 9/24; H03H 9/46; H03H 9/12

[52] U.S. Cl. .................. 333/186; 333/99 S; 333/142; 357/1; 367/7

[58] Field of Search .................. 333/186, 99 S, 142; 357/1, 4; 367/7, 8, 9, 43, 44; 330/5.5; 350/358

[56] References Cited

U.S. PATENT DOCUMENTS 3,562,676 2/1971 Parker, Jr. .................. 333/142
3,626,257 12/1971 Esaki et al. .................. 357/1 X
4,261,771 4/1981 Dingle et al. .................. 357/4 X

OTHER PUBLICATIONS

Trumpp et al.–"Sources of Loss Processes in Phonon Generation and Detection Experiments with Superconducting Tunneling Junctions", Z. Physik, vol. B 28, 1977; pp. 159–171.
Weber et al.–"Absence of Anomalous Kapitza Conductance on Freshly Cleaved Surfaces", Physical Review Letters, vol. 40, No. 22, May 29, 1978; pp. 1469–1471.
Quate–"The Acoustic Microscope", Scientific American, vol. 241, No. 4, Oct. 1979; pp. 3, 62–70, 186.
Narayanamurti et al.–"Direct Observation of Phonons Generated During Nonradiative Capture in GaAs p-n Junctions", Physical Review Letters, vol. 40, No. 1, Jan. 2, 1978; pp. 63–66.
Narayanamurti et al.–"Symmetry of Donor Related Centers Responsible for Persistent Photoconductivity in $Al_xGa_{1-x}As$", Physical Review Letters, vol. 43, No. 20, Nov. 12, 1979; pp. 1536–1539.
Narayanamurti et al.–"Selective Transmission of High--Frequency Phonons by a Superlattice: The Dielectric Phonon Filter", Physical Review Letters, vol. 43, No. 27, Dec. 31, 1979; pp. 2012–2016.

Primary Examiner—Marvin L. Nussbaum
Attorney, Agent, or Firm—Michael J. Urbano

[57] ABSTRACT

An acoustic superlattice of alternating layers of different acoustic impedance is disclosed as a filter for high frequency phonons. Applications discussed include spectrometers, acoustic imaging apparatus, and cavity resonators.

19 Claims, 8 Drawing Figures

DEVICES INCORPORATING PHONON FILTERS

BACKGROUND OF THE INVENTION

This invention relates to the propagation of acoustic waves and, more particularly, to the transmission of high frequency acoustic waves known as phonons.

Acoustic waves or sound waves result from the vibrations of atoms or molecules and at audible frequencies (lower than about 20 KHz) can be generated in a variety of ways: as human speech by the movement of our vocal chords, as instrumental music by forcing air through a trumpet, and as noise by pounding on a table top. Sound waves at these frequencies propagate reasonably well through the atmosphere as evidenced by the fact that the waves can be heard from afar. But, at higher ultrasonic frequencies (about 1 MHz), where sound waves are inaudible, the atmosphere is a poor medium for propagation; ultrasonic waves are rapidly dissipated in the gases of the air and can be made to travel appreciable distances only in condensed media such as liquids and solids.

On the other hand, ultrasonic waves are widely exploited for imaging; that is, for taking acoustic pictures by making sound waves, instead of light waves, incident on the object being imaged. These ultrasonic cameras are currently available for the study of underwater objects, internal structural features in materials and organs inside the human body. However, the wavelength of an ultrasonic camera is typically in the millimeter range which limits the resolution of the image to features no smaller than that size. However, the next generation of ultrasonic imaging apparatus, the acoustic microscope, offers hope of dramatically increasing resolution so that features of micrometer size can be "seen" acoustically.

As described by C. F. Quate in *Scientific American*, Vol. 241, No. 4, p. 3 (1979), the acoustic microscope is an experimental device which operates at acoustic frequencies in the vicinity of 1 GHz and, in the most advanced versions, at wavelengths measured in micrometers and fractions of a micrometer. At these wavelengths the acoustic microscope is comparable in resolution to the optical microscope, but, as Quate points out, resolution is only one parameter of the comparison, contrast is another. Acoustic waves and optical (light) waves are reflected and absorbed differently by the same object, making the acoustic image quite different in microscopic information content from the optical image. Quite plainly, the acoustic microscope "sees" microscopic features which the optical microscope cannot.

The basic physical phenomenon underlying the acoustic image is the change in velocity of sound waves as they cross an interface between two different materials. Quate notes that the velocity of sound waves can decrease by a factor of ten in traversing a solid-liquid interface. Indeed, the nature of the materials (i.e., their acoustic impedances) as well as the quality of the interface (i.e., the number of defects it contains) can even more drastically reduce the velocity of the waves and may even convert them to heat.

This problem is particularly acute at even higher acoustic frequencies in the hundreds of gigahertz range. At these enormously high frequencies, the sound waves are referred to as phonons, which may have extremely short wavelengths in the 10 Angstrom to several hundred Angstrom range.

Phonons are critically sensitive to the quality of an interface they are required to traverse. In this regard, an extensive study of the loss processes in phonon generation and detection was reported by H. J. Trumpp et al in *Z. Physik*, Vol. B 28, p. 159 (1977). They formed a first superconducting tunnel junction (STJ) on one surface of a silicon substrate to generate 280 GHz phonons in the substrate and formed a second STJ on another surface of the substrate to detect the phonons. They found that the total phonon loss was about 90 percent; that is, only about 10 percent of the phonons generated at the first STJ were above to travel through the substrate to the second STJ; the remainder was converted to heat. In addition, their measurements indicated that the main sources for phonon losses were localized at the boundaries of the tunnel junctions to the substrate. These boundaries were interfaces between the base superconducting electrodes of the STJs and the substrate.

With such phenomenally high losses one would expect that a phonon device having a plurality of interfaces would have virtually no utility as a practical matter. For example, if the phonon transmission through a single interface is only 10 percent, then after traversing N such interfaces the phonon signal would be $10^{-N}$ of its original value. For $N=10$, the signal level would be $10^{-10}$ times its original value, making detection of such low levels virtually impossible. Even if the transmission through the interface were twice as good, 20 percent, after traveling through ten interfaces, the phonon signal would be down to $(2\times 10^{-1})^{10} \sim 10^{-7}$ of its original value—still an extremely low level. It is apparent, therefore, that the prior art, as typified by the Trumpp et al. article, suggests that a plurality of interfaces is something to be avoided in phonon devices.

SUMMARY OF THE INVENTION

Much to our surprise, we discovered that phonons can be transmitted efficiently through a plurality of interfaces without debilitating conversion of the phonons to heat. In one experiment we demonstrated that high frequency (200–300 GHz), extremely short wavelength (300–200 Angstroms) phonons could be made to propagate through a 50-period acoustic superlattice of alternating layers of GaAs and AlGaAs, a structure which includes 101 interfaces in the superlattice alone. By making the layers of materials having different acoustic impedances (Z) and by making each layer of thickness $t=\lambda_o/4$, we were also able to build a phonon filter which selectively reflected phonons of wavelength $\lambda_o$. As a consequence, the reflected phonons represent a quasi-monochromatic source which could be used for imaging, spectrographic or other applications. Alternatively, the superlattice layers may be made of different acoustic impedances but of thickness $t=\lambda_o/2$, in which case phonons of wavelength $\lambda_o$ are selectively transmitted through the superlattice and represent a quasi-monochromatic source.

An interesting application of the reflection mode embodiment is an acoustic spectrometer in which the phonons from a phonon source are reflected from an acoustic superlattice to a plurality of detectors arranged in tandem. The detectors receive phonons of different wavelengths $\lambda$ depending on the angle of incidence of the phonon wave with the normal to the superlattice. Accordingly, which detectors exhibit output signals determines the spectral content of the phonon source. In another embodiment of the spectrometer, a single detector is employed, but the phonon source is scanned to determine its spectral content.

BRIEF DESCRIPTION OF THE DRAWINGS

These and other objects of our invention, together with its various features and advantages, can be readily understood from the following more detailed description taken in conjunction with the accompanying drawings, in which.

DETAILED DESCRIPTION

Figure 1:
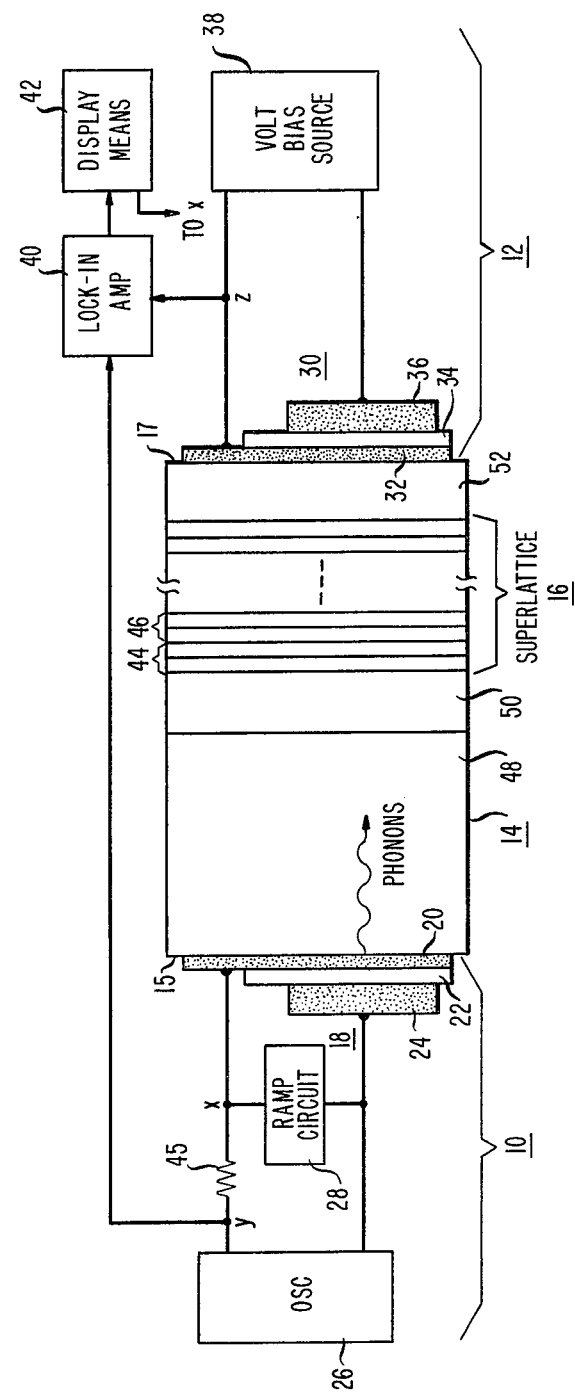
FIG. 1 is a schematic of apparatus used to demonstrate the selective transmission/reflection of phonons by an acoustic superlattice in accordance with one embodiment of our invention.

With reference now to FIG. 1, there is shown, in accordance with one embodiment of our invention, apparatus which we constructed to demonstrate the selective transmission and/or reflection of high frequency phonons by an acoustic superlattice. The apparatus includes phonon generator means 10 and phonon utilization means 12 coupled to one another by phonon transmission means 14 which includes an acoustic superlattice 16.

Generator means 10 illustratively comprises a superconducting tunnel junction (STJ) 18 and typically includes a base superconducting electrode 20 formed on one surface 15 of transmission means 14, a thin oxide tunnel barrier 22 on the base electrode 20 and a superconducting counterelectrode 24 formed over barrier 22. STJ 18 is driven by a low frequency oscillator 26 which has its output connected across electrodes 20 and 24. Ramp circuit 28 is likewise connected across these electrodes and serves to allow the DC voltage bias point of STJ 18 to be shifted. In cases where the STJs exhibit a Josephson zero-voltage supercurrent, a magnetic field source (not shown) is used to suppress the supercurrent by generating a magnetic field in the plane of the junction (i.e., of the barrier 22).

Detector means 12, on the other hand, includes another STJ 30 formed on another surface 17 of transmission means 14. STJ 30 comprises a superconducting base electrode 32 formed on surface 17, a thin oxide tunnel barrier 34 formed on base electrode 32 and a superconducting counterelectrode 36 formed on barrier 34. A controlled voltage bias source 38 has its output connected across electrodes 32 and 36 to control the operating point of STJ 30. The output of oscillator 26 at node y and the output of STJ 30 at node z are applied to the input of a lock-in amplifier 40 which drives display means 42. The latter is illustratively a chart recorder which receives one input from the output of amplifier 40 and another input from node x. The voltage at node x corresponds to the voltage output of oscillator 26 minus the voltage drop across resistor 45 which is connected between nodes x and y.

Although not shown for simplicity and clarity of illustration, cryogenic means are typically included for maintaining the temperature of the STJs below the superconducting transition temperature of their electrodes. Illustratively, the cryogenic means includes liquid He cryostats for maintaining the temperature below about 4 degrees K. Cryogenic temperatures also significantly reduce the attenuation of short wavelength phonons (e.g., of the order of 100 Angstroms).

In order for detector STJ 30 to be responsive to the phonons of generator STJ 18, the electrodes of the detector should be made of superconductive materials having a narrower superconducting energy gap 2Δ than those of the generator. Illustratively, the electrodes of STJ 30 comprise Al having an energy gap $2\Delta_{Al} \sim 0.54$ meV at 1.05 degrees K., and the electrodes of STJ 18 comprise Sn having an energy gap $2\Delta_{Sn} \sim 1.17$ meV at 1.05 degrees K.

Transmission medium 14 comprises a single crystal semiconductor body which includes an acoustic superlattice 16 having its layers oriented transverse to the direction of propagation of phonons between STJ 18 and STJ 30. Superlattice 16 is a periodic structure which includes a plurality of pairs of layers 44, 46, etc., with adjacent layers having different acoustic impedances $Z_1$ and $Z_2$, where $Z = \rho v$, $\rho$ is the density of the material and v is the sound velocity as measured in the material. Essentially two modes of operation are possible for the superlattice depending on the thickness of its layers: reflection of phonons of a selected wavelength $\lambda_o$ when the thickness t of each layer satisfies the condition $t = \lambda_o/4$; and transmission of phonons of a selected wavelength $\lambda_o$ when $t = \lambda_o/2$. In each case, the periodicity d of the superlattice is given by d=2t.

Preferably, the layers of the acoustic superlattice are fabricated of essentially lattice-matched materials, such as $Al_xGa_{1-x}As - Al_yGa_{1-y}As$ ($0 \leq x,y \leq 1$, $x \neq y$), in order to reduce the number of interface defects which tend to convert the phonons to heat and hence prevent their transmission from generator to detector. In this regard, the superlattice is advantageously fabricated by molecular beam epitaxy (MBE).

As depicted in FIG. 1, transmission medium 14 typically includes also a single crystal substrate 48, an epitaxial buffer layer 50, the superlattice 16 and another buffer layer 52. The crystal orientation (or epitaxial growth direction) may be either (111) or (100) although, for reasons discussed hereinafter, (111) may be preferred.

Example: Phonon Mirror

In this example, we describe a thin film spectrometer based on the selective filtering action of an acoustic superlattice 16 of $Al_xGa_{1-x}As$ ($x=0$) and $Al_yGa_{1-y}As$ ($y=0.5$) layer pairs 44, 46, etc., grown by MBE on a GaAs substrate 48. The filtering action arises from the selective reflection by the superlattice of phonons of wavelength $\lambda_o$ that fulfill the Bragg condition $\lambda_o=2d$, where d is the superlattice period. Due to the close analogy with optical dielectric mirrors, we shall call an appropriately designed thin film heterostructure superlattice a "dielectric" phonon mirror. Besides the frequency selectivity, one of the most significant results of our experiments is the observation that high frequency phonons pass through the more than 100 interfaces of the multilayer structure without significant degradation.

The reflection of phonons propagating normal to the interface between two elastic media having different acoustical impedances $Z_1$ and $Z_2$ is analogous to the reflection of electromagnetic waves at the interface between two optical media having different indices of refraction $n_1$ and $n_2$. In order to calculate the phonon transmission properties of a multilayer stack, we followed the mathematical procedures outlined in classical textbooks on optics. The acoustic properties of each semiconductor layer are expressed in terms of a characteristic matrix. The properties of the superlattice are then described as an equivalent layer with a matrix that is a product of the characteristic matrices of the individual layers from which transmission and reflection coefficients can be readily derived. Individual matrix multiplication allows the investigation of the influence of layer thickness fluctuations and of a systematic error in the relative thicknesses of GaAs and AlGaAs (due to sound velocity uncertainties) on the reflection properties of the stack.

Figure 2:
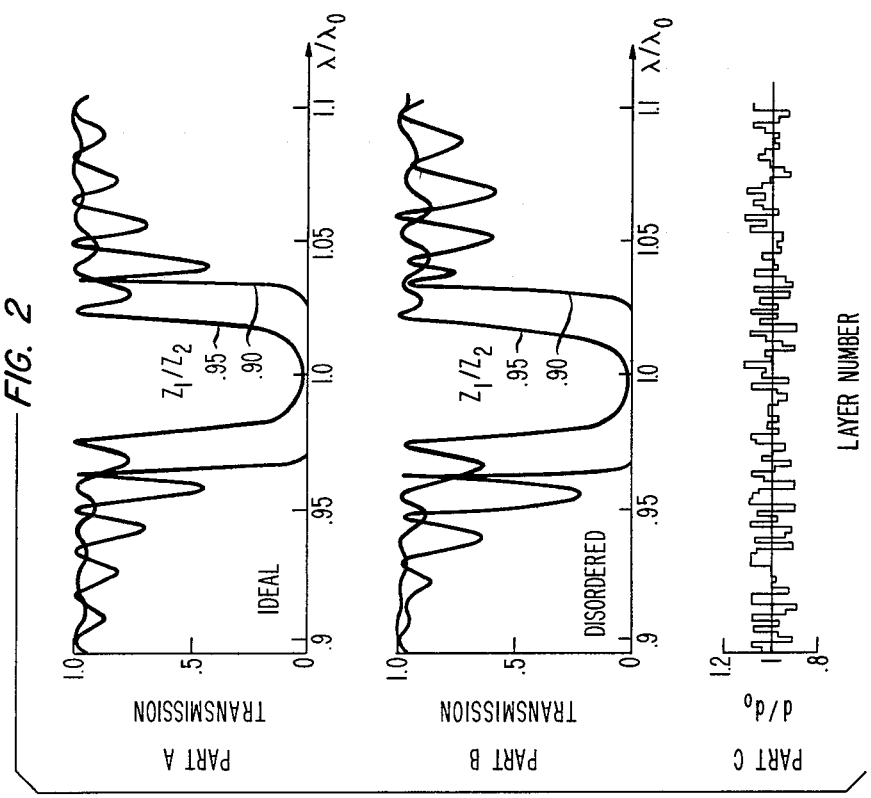
FIG. 2 shows calculated curves depicting the transmission of phonons through acoustic superlattices of 50 layers having acoustic impedance ratios $Z_1/Z_2$ of 0.95 and 0.90. Part A shows the case of an ideal superlattice which assumes uniform thicknesses of the layers, and Part B assumes a nonideal superlattice with a 10 percent random disorder in thickness as shown in Part C.

FIG. 2, Part A shows the transmission for an ideal acoustic superlattice of 50 layer pairs of GaAs/$Al_x$-$Ga_{1-x}As$ of individual layer thicknesses $\lambda_o/4$ for two different values of relative impedances $Z_1/Z_2$. Although the sound velocity in AlGaAs is unknown, we estimated the velocity by interpolating theoretical dispersion curves of GaAs and AlGaAs given by Barker et al in *Phys. Rev.* B, Vol. 17, p. 3181 (1978). The ratio $Z_1/Z_2$ is believed to lie in the region of 0.90 for $x=0.5$. FIG. 2, Part B gives the result of the same calculation if we allow for a random thickness variation of each individual layer of ±10 percent, which is the upper limit of the disorder we might expect in our MBE-grown samples. Comparing FIG. 2, Parts A and B, we find that this degree of disorder degrades only slightly the reflection properties of our acoustic superlattice. Calculations that included sound velocity uncertainties of up to 10 percent had practically no additional influence on the linewidth.

A schematic of the sample used in our experiments is shown in FIG. 1. A superlattice 16 of GaAs/$Al_{0.5}Ga_{0.5}As$ layer pairs sandwiched between two 1 μm thick GaAs buffer layers 50 and 52 was grown by MBE on top of a 2.5 mm bulk GaAs substrate 14. Two different structures both comprising 50 layer pairs were generated. In one case, a <100> GaAs substrate 14 was used to grow a superlattice 16 with a period d=93 Angstroms along this crystallographic direction. Two such <100> samples were grown and studied. The other structure comprised a superlattice 16 grown in the <111> direction and had a period of 122 Angstroms.

The phonons were generated by STJ 18 having Sn electrodes each 2000 Angstroms thick and were detected after passage through the body 14 (including the superlattice 16) by means of STJ 30 having Al electrodes each 1500 Angstroms thick. The STJs had areas of about 0.5 mm² and normal state resistances of about 0.1Ω. The energy gaps of the Sn and Al STJs were $2\Delta_{Sn} \sim 1.17\pm 0.05$ meV and $2\Delta_{Al} \times 0.54 \pm 0.02$ meV, respectively, at 1.05 degrees K.

Most of the experiments were done by biasing STJ 18 by means of ramp circuit 28 and then sweeping the bias with a small modulation superimposed via oscillator 26 to allow phase sensitive detection. Electronic feedback was used in bias source 38 to stabilize the voltage bias of the detecting STJ 30 in order to guarantee a constant sensitivity during the source of the experiment. For generator voltage biases ($V_G$), such that $eV_G \sim 2\Delta_{Sn}$, where e is the electron charge, the generator STJ 18 emits recombination phonon radiation. These phonons are known as 2Δ-phonons. For larger biases, $eV_G > 2\Delta_{Sn}$ both relaxation phonons of energy $eV_G - 2\Delta_{Sn}$ and recombination phonons are emitted. The relaxation phonon spectrum has a cut off at $2\Delta_{Sn}$ due to strong reabsorption of higher frequency phonons in the generator STJ. This reabsorption and the detector threshold of $2\Delta_{Al}$ provided the upper and lower limit for voltage tunable phonon spectroscopy in the energy region $2\Delta_{Al}$ to $2\Delta_{Sn}$ in our experimental arrangement.

Figure 3:
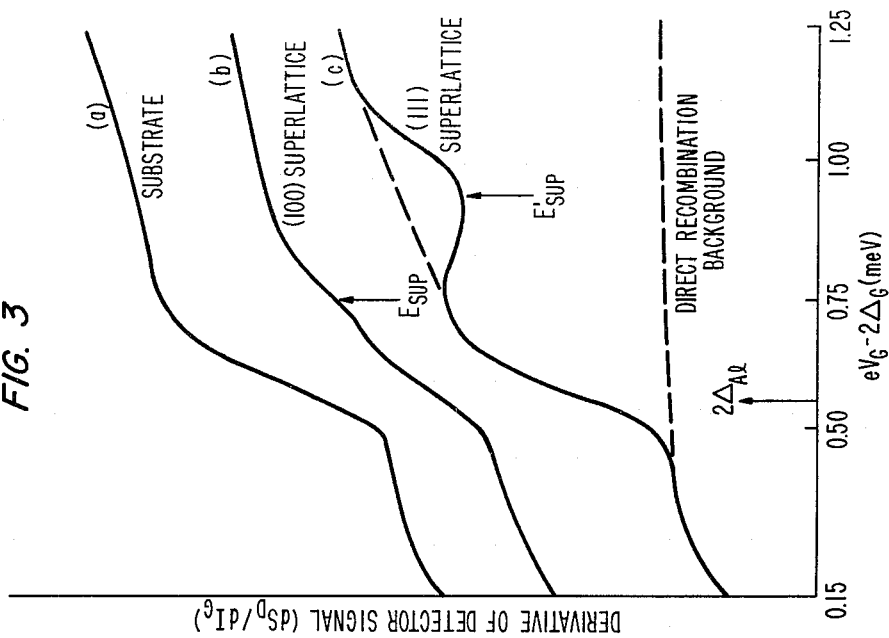
FIG. 3 shows the derivative of the detector signal with respect to generator current ($dS_o/dI_G$) as a function of generator voltage for the apparatus of FIG. 1. Curve (a) is for STJs formed on a (100) GaAs substrate with no acoustic superlattice. Curve (b) is for STJs formed on a structure including a (100) GaAs substrate and a (100) acoustic superlattice with d=93 Å and $Z_1/Z_2 \approx 0.88$. Curve (c) is for STJs formed on a structure including a (111) GaAs substrate and a (111) acoustic superlattice with d=122 Å and $Z_1/Z_2 \approx 0.88$. Note the nonlinear voltage scale at low biases.

FIG. 3 shows several traces of the derivative of the detector signal with respect to the generator current ($dS_D/dI_G$) as a function of $eV_G - 2\Delta_G$, where $2\Delta_G = 2\Delta_{Sn}$ in this case. Case (a) corresponds to a (100) substrate with no acoustic superlattice and with tunnel junction generators and detectors. Curve (a) is typical of phonon transmission in our pure GaAs which is free of transition metal impurities such as Cr. It shows the characteristic direct recombination background below ~0.5 meV and a sharp rise at $(eV_G - 2\Delta_G) \sim 2\Delta_{Al}$ indicative of quantum generation and detection. The width of this rise is believed to be due to the energy gap anisotropy of the Sn generator STJ 18 and the finite modulation amplitude. Case (b) shows $dS_D/dI_G$ after passage through a (100) superlattice 16 with d~93 Angstroms. Compared with case (a), the data show attenuation in the region from 0.65 to 0.8 meV. The present experiment is sensitive to the total intensity of longitudinal (L) and transverse (T) phonon modes. However, in the <100> direction we know from independent time of flight experiments that, because of focusing effects, the dominant phonons are the transverse waves. For a (100) sound velocity of $3.3 \times 10^5$ cm/sec in GaAs, the phonon reflection band is expected at 0.73 meV as shown by the arrow labeled $E_{sup}$. The reduction in the detector signal was seen in two different samples but because of its proximity to the $2\Delta_{Al}$ rise, a quantitative line shape analysis was precluded. We, therefore, repeated the experiment with a third sample having a superlattice of d=122 Angstroms along a (111) direction. In this direction, the longitudinal phonon modes are weakly focused, and the transverse modes are weakly defocused so that they have comparable intensities. For a longitudinal (L) sound velocity of $5.4 \times 10^5$ cm/sec, the center of the band pass filter is expected to be $\sim 0.93$ meV as is observed in curve (c). The transverse waves should show a minimum around 0.48 meV just outside the low energy detector sensitivity.

Figure 4:
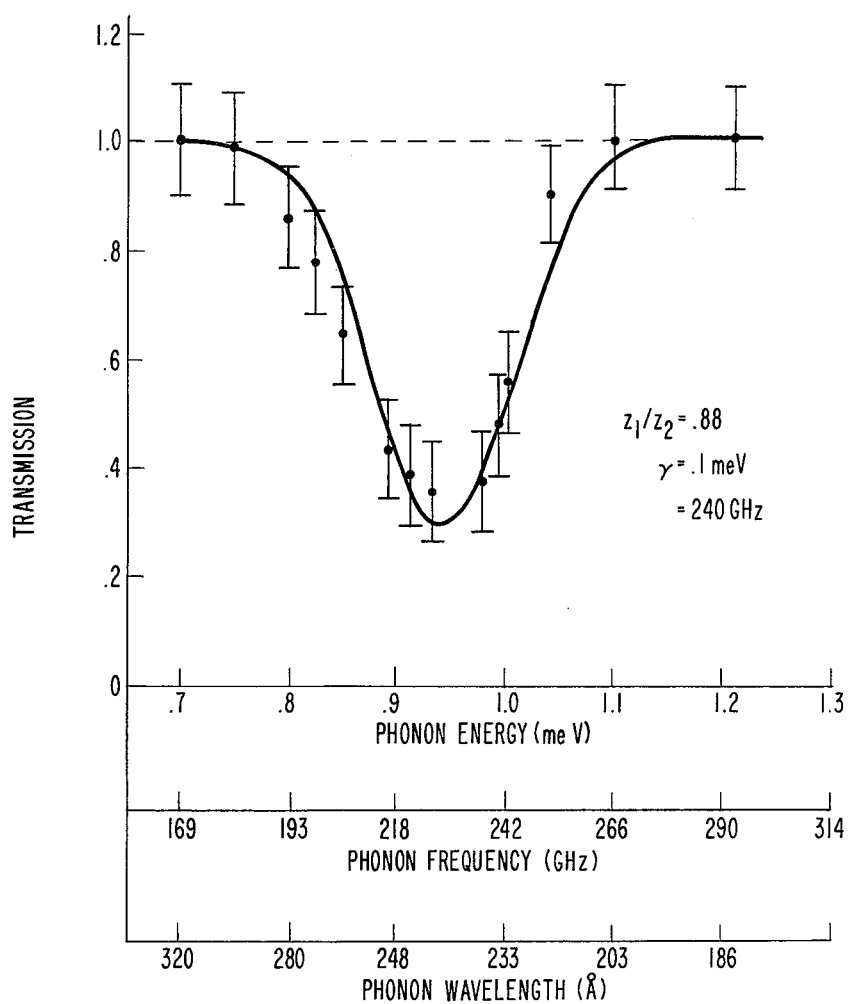
FIG. 4 shows the normalized longitudinal phonon transmission for the (111) acoustic superlattice of FIG. 3, curve (c), as a function of phonon energy, wavelength and frequency. The full line depicts a theoretical curve which takes into account various broadening mechanisms.

The strong L mode reflection by the superlattice in case (c) represents an estimated 60 to 70 percent of the mode strength at the peak. The principal uncertainties in estimating the magnitude and shape of the filter function are the precise shape of the recombination and relaxation phonon background [dashed lines of FIG. 3, curve (c)] and the exact strength of the L and T mode intensities (taken to be 0.35 and 0.65, respectively). Our best estimate of the absolute values of the L mode superlattice resonance in the <111> direction deduced from FIG. 3, curve (c) is shown in FIG. 4. The observed width of about 0.16 meV is larger than that expected from the sum of the energy width of the "2Δ rise" of the Sn STJ 18 ($\sim 0.05$ meV). We believe, a significant portion of the broadening arises from the distribution in wave vectors accepted by the detector due to its finite aperture and due to focusing effects. Calculations and measurements of this distribution indicate an asymmetric k-distribution and a width $\sim 5$ percent for L modes in the <111> direction. Irrespective of the actual shape and broadening mechanisms, the integrated transmission loss of the observed resonance should equal the integrated transmission loss of the true filter (see FIG. 2). From the value of the total integrated area of the resonance we deduce a value of $Z_1/Z_2 = 0.88$ for the layers of our superlattice. The theoretical curve shown in FIG. 4 was calculated using this value of $Z_1/Z_2$, the phonon pulse shape, and a Gaussian of width 0.1 meV to describe all the other broadening mechanisms. The agreement with our data is satisfying considering the inherent experimental uncertainties. This is also consistent with the results of case (b) where focusing effects cause acceptance of phonons over a wide distribution in wave vectors ($\sim 15$ percent). The intrinsic linewidth of the filter, however, is much smaller than 15 percent and can be made arbitrarily small by making the ratio $Z_1/Z_2$ close to, but not equal to, unity. See, for example, the line narrowing which occurs in FIG. 2 for $Z_1/Z_2 = 0.95$ compared to 0.90. When the ratio $Z_1/Z_2$ is close to unity, say 0.99, then the number of layers in the superlattice should be increased to compensate for the reduced reflectivity.

As mentioned previously, the fabrication of the acoustic lattice in the GaAs-AlGaAs materials system with (111) orientation may be preferred because we were able to obtain relatively high intensity L-phonons whose λ was greater than that of the T-phonons of the same frequency. However, it still may be that a (100) orientation will prove advantageous because it is known that MBE growth on the (100) plane yields better quality layers and interfaces.

It is to be understood that the above-described arrangements are merely illustrative of the many possible specific embodiments which can be devised to represent application of the principles of the invention. Numerous and varied other arrangements can be devised in accordance with these principles by those skilled in the art without departing from the spirit and scope of the invention.

Spectrometers

Figure 5:
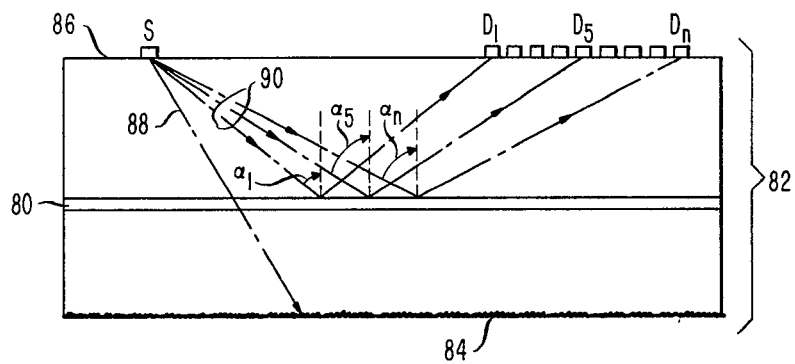
FIGS. 5 and 6 are schematics of acoustic spectrometers in accordance with two embodiments of our invention.

In the reflection mode the acoustic superlattice can be employed in a spectrometer to determine the spectral content of a phonon source. In FIG. 5, for example, acoustic superlattice 80 is part of semiconductor body 82 which has a roughened bottom major surface 84 and a top major surface 86. On surface 86 are located a phonon source S and a plurality n of phonon detectors $D_i$ (i=1,2 ... n) arranged in tandem. Illustratively, source S might be a STJ or simply a heat source (e.g., a metal film in which a laser beam, not shown, is absorbed), and detectors $D_n$ might be STJs or bolometers.

Source S emits phonons in a variety of directions into body 82 and at a plurality of different wavelengths. Phonons 88 are transmitted through superlattice 80 and are absorbed or scattered at roughened surface 84. But, the phonons 90 reflected by superlattice 80 do so only at particular angles $\alpha_n$ which satisfy the Bragg condition $m\lambda = 2d \sin \alpha$, where m is an integer, λ is the phonon wavelength, and d is the acoustic superlattice period. Thus, a phonon of wavelength $\lambda_i$ (i=1,2 ... n) is reflected from superlattice 80 at angle $\alpha_i$ and is received only by detector $D_i$. An electrical signal at the output of the $i^{th}$ detector signifies the presence of phonons of wavelength $\lambda_i$ in source S.

In order to obtain reasonable discrimination between the various possible wavelengths, the gaps between adjacent detectors should be made as small as is practically possible and, preferably, the gaps should be smaller than the width of the detectors and/or the source.

Figure 6:
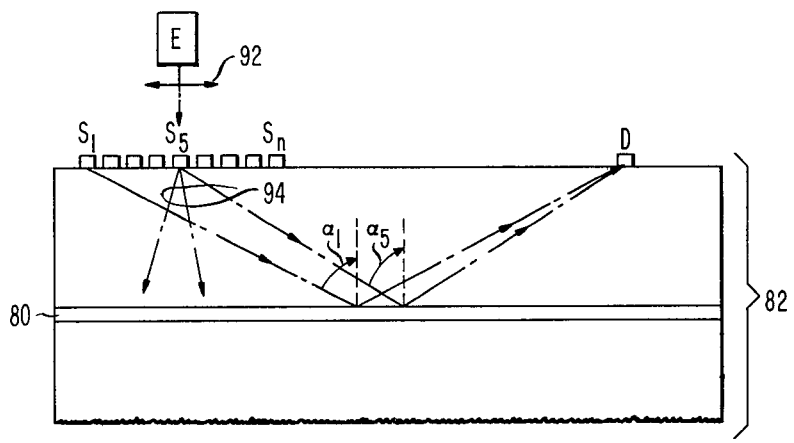

The requirement in the spectrometer of FIG. 5 for a plurality of tandem detectors can be obviated as shown in FIG. 6. Here, a single detector is employed, but the phonon source S is scanned in the direction of arrow 92 by energy beam source E. The source S may be a plurality n of essentially identical metal segments (e.g., stripes, dots) $S_i$ (i=1,2 ... n) as shown, or it may be a continuous film. In either case, energy beam source E (e.g., a laser, electron gun, etc.) generates heat in, say, segment $S_5$ which in turn causes phonons 94 to emanate into body 82. Only phonons of wavelength $\lambda_5$, however, which are reflected from superlattice 80 at angle $\alpha_5$ satisfying the Bragg condition will be incident on detector D. Similarly, when the beam of source E is incident on segment $S_1$ only phonons of wavelength $\lambda_1$ will be reflected at angle $\alpha_1$ from superlattice 80 to detector D. Thus, by scanning the source S each of its spectral components can be detected sequentially by the electrical output of detector D.

Another application of these spectrometer configurations is the detection of absorbing regions within semiconductor body 82. More specifically, where the phonon distribution of source S is known a priori, then the presence of absorbing regions in the body 82 can be detected because certain phonon frequencies, corresponding to those absorbed, will be absent from the spectrum measured by the detector(s).

Phonon Imaging

Figure 7:
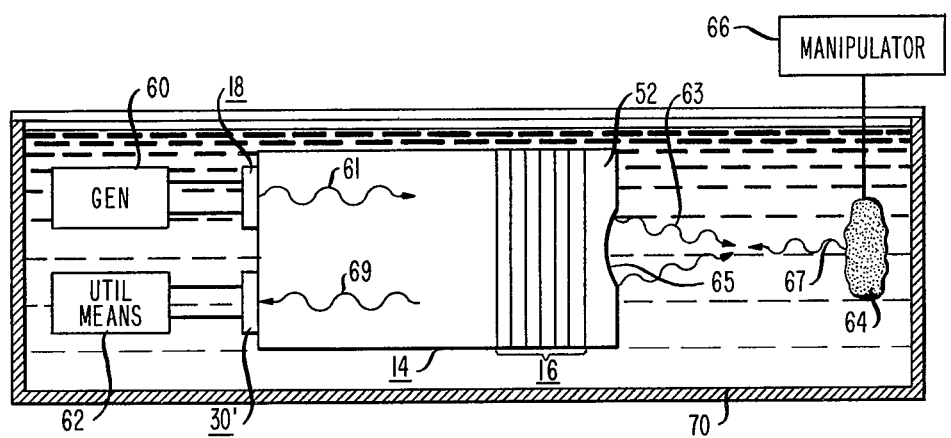
FIG. 7 is a schematic of another embodiment of our invention for using our quasi-monochromatic phonon source to image an object submerged in a liquid.

In particular, FIG. 7 depicts schematically the use of a quasi-monochromatic phonon source in imaging apparatus. In this type of application, the transmission medium 14, and more specifically the acoustic superlattice 16, is designed to operate in a transmission mode. That is, the individual superlattice layers are made to be approximately $\lambda_o/2$ thick so that, of the phonons 61 generated by STJ 18 (via excitation by generator 60), essentially only those phonons 63 in a sub-range (linewidth) near wavelength $\lambda_o$ are transmitted by the superlattice. These transmitted phonons 63 are focused by means of a lens 65 which is a concave curved surface etched or otherwise formed at one end of superlattice 14. Conveniently, the lens 65, which may be formed in the buffer layer 52, is of the type described by Quate, *Scientific American,* supra and which produces a spherical wavefront. Thus, the object 64 to be imaged is preferably placed at the focal length of the lens 52 where it reflects the phonons. The wavefront of the reflected phonons 67 is distorted by the elastic properties of the object 64 and thereby carries information concerning its microscopic features. The reflected phonons 67 are retransmitted through transmission medium 14 and, as depicted by arrow 69, are detected by STJ 30' which is illustratively formed on the same surface as STJ 18. The electrical output of STJ 30' is applied to utilization means 62 which, for imaging purposes, would include suitable equipment for forming an acoustic micrograph.

In order to view different portions of object 64, means are provided for translating the object so that the focused phonons 63 are incident sequentially on different parts of the object. This scanning function may be performed by a mechanical or electro-mechanical arrangement identified generally as a manipulator 66. Alternatively, it may be possible to have the object remain stationary and to spatially scan the phonon beam 63 by electronic means not shown.

Finally, it should be noted that the imaging apparatus described above is shown to be submersed in a liquid bath within container 70. Since STJs 18 and 30' must be cooled to cryogenic temperatures, the bath is illustratively a cryogenic liquid such as liquid helium. The use of a cryogenic liquid has the added advantage that the wavelength of the transmitted phonons 63 decreases abruptly as the phonons leave the superlattice 16 and enter the liquid. Thus, whereas the phonon wavelength may be 100-200 Angstroms in the superlattice, it may be only 10-20 Angstroms in the liquid. Consequently, imaging of object 64 with much finer resolution is made possible.

Cavity Resonator

Figure 8:
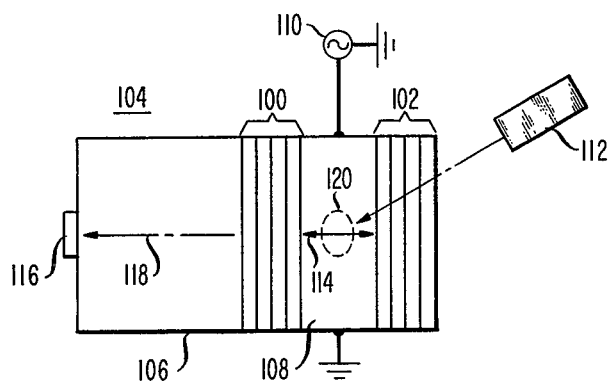
FIG. 8 is a schematic of still another embodiment of our invention in which a pair of acoustic superlattices in the reflection mode are used to form a cavity resonator for phonons.

Inasmuch as the acoustic superlattice in the reflection mode functions like an acoustic mirror, a pair of such superlattices 100-102 can be employed to fabricate a phonon cavity resonator as shown in FIG. 8. Here, a semiconductor body 104 includes a substrate 106 on which are formed a superlattice 100, an intermediate zone 108, and a superlattice 102. Source means, such as current/voltage source 110 or optical radiation source 112, is coupled to body 104 for generating phonons within intermediate zone 108. Some of these phonons are selectively reflected by superlattices 100 and 102 in a direction 114 orthogonal to the layers of the superlattices. These reflected phonons then bounce back and forth between the superlattices which act as mirrors. They are not 100 percent reflectors, however, so a portion 118 of the resonant phonons emanates from the superlattice 100 and are detected by utilization means 116.

When the optical radiation excitation means includes laser 112, then one embodient contemplates making superlattice 102 transparent to the laser wavelength and making intermediate zone 108 absorptive at the same wavelength. Thus, for a laser wavelength of $\leq 0.9$ μm zone 108 might be GaAs whereas superlattice 102 might be alternating layers of $Al_{0.1}Ga_{0.9}As$ and $Al_{0.2}Ga_{0.8}As$. Superlattice 100 could have a similar composition, and substrate 106 would typically be GaAs.

The source means, of course, may apply excitation either in pulsed or continuous form. Moreover, in the case of a laser 112, the laser beam may be absorbed in only a localized portion 120 of zone 108, may be scanned across zone 108 or, with appropriate beam shapes, may be absorbed in braoder (i.e., less localized) portions of zone 108.

What is claimed is:

1. A phonon device comprising
a semiconductor body in which phonons over a range of wavelengths can be made to propagate simultaneously,
source means coupled to said body for exciting said phonons to propagate therein, and
filter means coupled to said body so as to intercept said phonons and to transmit phonons in a particular sub-range of said wavelengths and to reflect phonons outside said sub-range, said filter means comprising an acoustic superlattice of essentially lattice-matched semiconductor layers of alternating acoustic impedance.

2. The device of claim 1 including detector means coupled to said body so as to intercept said transmitted phonons.

3. The device of claim 1 including detector means coupled to said body so as to intercept said reflected phonons.

4. The device of claims 2 or 3 wherein said source means and said detector means each includes a superconducting tunnel junction.

5. The device of claim 4 wherein the superconducting energy gap of said detector means is smaller than that of said source means.

6. The device of claim 4 wherein said source means and said detector means are formed on opposite major surfaces of said body, said detector means being adapted to detect said transmitted phonons.

7. The device of claim 4 wherein said source means and said detector means are formed on the same major surface of said body.

8. The device of claim 7 for imaging an object further including
lens means on said body for focusing said transmitted phonons onto said object, phonons reflected by said object being re-transmitted through said acoustic superlattice to said detector means, and
means for causing said transmitted phonons to be sequentially incident on different portions of said object.

9. The device of claim 8 wherein said body includes a buffer layer adjacent said superlattice and said lens means includes a concave curved surface formed in said buffer layer.

10. The device of claim 8 further including means for submersing at least said object, said body and said tunnel junctions in a cryogenic liquid.

11. The device of claim 1 wherein said acoustic superlattice comprises pairs of adjacent layers of $Al_xGa_{1-x}As$ and $Al_yGa_{1-y}As$ ($0 \leq x, y \leq 1$, $x \neq y$).

12. The device of claim 3 for use as an acoustic spectrometer wherein said source means and said detector means are formed on the same major surface of said body, said source means generating phonons at a plurality of wavelengths, said acoustic superlattice reflecting those wavelengths which satisfy the Bragg condition and said detector means receiving phonons of selected ones of said reflected wavelengths.

13. The device of claim 12 wherein said detector means comprises a plurality n of detectors arranged in tandem on said major surface so that the $i^{th}$ detector $(i=1,2\ldots n)$ receives essentially only phonons of wavelength $\lambda_i$ which are reflected from said superlattice at an angle $\alpha_i$ satisfying the Bragg condition.

14. The device of claim 12 wherein said source means comprises a thin metal film arranged on said surface and further including an energy beam source for scanning said film to sequentially generate phonons at different places in said body, for each position of said beam said detector means receiving essentially only phonons of a particular wavelength which are reflected from said superlattice and satisfy the Bragg condition.

15. The device of claim 14 wherein said film is segmented and said beam is made to scan said segments sequentially.

16. An acoustic cavity resonator comprising a pair of acoustic superlattice mirrors comprising essentially lattice-matched semiconductor layers of alternating acoustic impedance,
 a semiconductor zone intermediate to and contiguous with said acoustic superlattice mirrors, and
 source means for exciting phonons in said zone, whereby only phonons of particular wavelengths reflected by said mirrors resonate in a direction orthogonal to said mirrors.

17. The resonator of claim 16 wherein said source means comprises means for applying electric current or voltage to said zone.

18. The reasonator of claim 16 wherein said source means comprising a source of optical radiation which is absorbed by said zone.

19. The resonator of claim 18 wherein at least one of said superlattices is made transparent to said radiation, said zone absorbs said radiation and said radiation is directed through said at least one superlattice into said zone.

* * * * *